US011300395B1

(12) United States Patent
Story (10) Patent No.: US 11,300,395 B1
(45) Date of Patent: Apr. 12, 2022

(54) ATTACHMENT FOR TAPE MEASURE THAT CAN RECEIVE AN ELONGATED MEMBER SUCH AS MOLDING

(71) Applicant: Justin Story, Leoma, TN (US)

(72) Inventor: Justin Story, Leoma, TN (US)

( * ) Notice: Subject to any disclaimer, the term of this patent is extended or adjusted under 35 U.S.C. 154(b) by 0 days.

(21) Appl. No.: 16/814,252

(22) Filed: Mar. 10, 2020

(51) Int. Cl.
*G01B 3/1084* (2020.01)
*G01B 3/1071* (2020.01)
*G01B 3/1061* (2020.01)

(52) U.S. Cl.
CPC ......... *G01B 3/1084* (2013.01); *G01B 3/1071* (2013.01); *G01B 2003/1066* (2013.01); *G01B 2003/1076* (2013.01)

(58) Field of Classification Search
CPC .......... G01B 3/1084; G01B 2003/1076; G01B 2003/1066; G01B 3/1071
USPC .................. 33/760, 755, 712, 759, 770, 549
See application file for complete search history.

(56) References Cited

U.S. PATENT DOCUMENTS

| | | | | |
|---|---|---|---|---|
| 1,599,852 A | * | 9/1926 | Thomas | G01B 3/1071 33/485 |
| 2,795,050 A | * | 6/1957 | Van Fleet | G01B 3/1071 33/757 |
| 3,913,232 A | * | 10/1975 | Marcell | G01B 3/04 33/490 |
| 5,458,946 A | | 10/1995 | White, Jr. | |
| 5,782,007 A | * | 7/1998 | Harris | B26B 29/06 33/768 |
| 6,226,885 B1 | * | 5/2001 | Korich | B25H 7/02 33/760 |
| 6,966,123 B1 | * | 11/2005 | Rubino | B25B 5/06 269/283 |
| 7,181,860 B1 | | 2/2007 | Umholtz | |
| 7,281,340 B2 | * | 10/2007 | Greally | G01B 3/1056 33/758 |
| 8,028,436 B2 | * | 10/2011 | Camp | G01B 3/1056 33/760 |
| 8,141,266 B2 | | 3/2012 | Sun | |
| 8,402,671 B1 | * | 3/2013 | Marhold | G01B 3/1071 33/758 |

(Continued)

FOREIGN PATENT DOCUMENTS

GB 2272290 A 5/1994

*Primary Examiner* — Christopher W Fulton
(74) *Attorney, Agent, or Firm* — Patterson Intellectual Property Law, P.C.; Edward D. Lanquist, Jr.; Alex H. Huffstutter (57) ABSTRACT

The present invention relates to a measurement apparatus designed to fit on the end of a measuring tape for measuring the length of an elongated member having a beveled cut end. The measurement apparatus may have a first receptacle for measuring from an acute point of the beveled cut end. The measurement apparatus may have a second receptacle for measuring from an obtuse point of the beveled cut end. The second receptacle may be offset from the first receptacle by an offset distance in a lengthwise direction. The measurement apparatus may include a tape channel positioned between the first and second receptacles. The measurement apparatus may include a longitudinally adjustable hinge and a latch. The longitudinally adjustable hinge and the latch may be used to secure the measuring tape in the tape channel. The longitudinally adjustable hinge may also be used to adjust the offset distance.

23 Claims, 9 Drawing Sheets

(56) References Cited

U.S. PATENT DOCUMENTS

| | | |
|---|---|---|
| 8,832,958 B2 | 9/2014 | Mabey |
| 9,593,925 B2 * | 3/2017 | Couture .................... G01B 3/14 |
| 2015/0219430 A1 * | 8/2015 | Sampson ............. G01B 3/1084 33/761 |
| 2015/0345923 A1 * | 12/2015 | Ryan .................... G01B 3/1071 33/758 |
| 2017/0322007 A1 * | 11/2017 | Stewart ................ G01B 3/1084 |

* cited by examiner

ATTACHMENT FOR TAPE MEASURE THAT CAN RECEIVE AN ELONGATED MEMBER SUCH AS MOLDING

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

1. Field of the Invention

The present invention relates generally to a device for measuring elongated members such as trim pieces and the like. More particularly, this invention pertains to a device for attachment to a zero-point end of a measuring tape for measuring elongated members having a beveled cut end.

2. Description of the Prior Art

A common task arising in multiple disciplines such as carpentry is measuring the length of elongated members such as trim pieces. This can be difficult to do with trim pieces having a beveled cut end because measurement is made from either an acute angled point or an obtuse angled point of the beveled cut end, neither of which are easily hooked or secured to a zero-point end of a measuring tape. The difficulty of measuring the trim piece increases as longer and more flexible trim pieces are used. Various solutions have been provided for measuring the length of beveled trim pieces, all of which have their shortcomings. Thus, there is a need for an improved tool to aide in measuring trim pieces and other elongated members having a beveled cut end.

BRIEF SUMMARY OF THE INVENTION

In one embodiment, a measuring apparatus is provided for measuring a length of an elongated member having a beveled cut end with a measuring tape having a zero-point end. The beveled cut may be at any angle. The apparatus includes a first receptacle and a second receptacle. The first receptacle may have a receptacle length defining a lengthwise direction. The first receptacle may be configured to receive the beveled cut end of the elongated member with the length of the elongated member extending in the lengthwise direction. The first receptacle may include a first interior stop. The first receptacle may further include a first location configured to receive the zero-point end of the measuring tape. The second receptacle may be configured to receive the beveled cut end of the elongated member with the length of the elongated member extending in the lengthwise direction. The second receptacle may have a second interior stop offset from the first interior stop by an offset distance in the lengthwise direction.

Such an apparatus may also be configured to align the first interior stop with the zero-point end.

Such an apparatus may also have the offset distance adjustable.

Such an apparatus may also have the first and second receptacles configured to couple to an intermediate portion of the measuring tape extending in the lengthwise direction.

Such an apparatus may also include a tape receiving channel positioned between the first receptacle and the second receptacle. The tape receiving channel may include a plurality of location markers for indicating the offset distance. The tape receiving channel may also include a plurality of lengthwise protrusions configured to frictionally engage an intermediate portion of the measuring tape.

Such an apparatus may also include a longitudinally adjustable hinge. The longitudinally adjustable hinge may be configured to pivotally attach the first receptacle and second receptacle in the lengthwise direction. The longitudinally adjustable hinge may include a pin and a plurality of open knuckles configured to slidably receive the pin when the first and second receptacles are in an open position. The pin and plurality of knuckles may have first and second interlocking elements that prevent sliding when the first receptacle and second receptacle are in a closed position. The offset distance between the first interior stop and second interior stop may be adjustable when the longitudinally adjustable hinge is in the open position. The offset distance between the first interior stop and second interior stop may be fixed when the longitudinally adjustable hinge is in the closed position.

Such an apparatus may also include a latch configured to selectively fix the relative positions of the first receptacle and the second receptacle.

Such an apparatus may also have each of the first end stop and second end stop configured at a stop angle relative to the lengthwise direction. The stop angle may correspond with a beveled angle of the beveled cut end. The stop angle may also be adjustable.

In another embodiment an assistance tool is provided for measuring a length of an elongated work piece having a beveled cut end with a measuring tape having a zero-point end. The assistance tool includes a first receiver, a second receiver, and a longitudinally adjustable hinge connecting the first receiver and the second receiver. The first receiver may have a receiver length defining a longitudinal direction. The first receiver may be configured to selectively receive the beveled cut end of the elongated work piece with the length of the elongated work piece extending in the longitudinal direction. The first receiver may include a first interior stop arranged to abut an acute point of the beveled cut end when the beveled cut end is received in the first receiver. The first receiver may further include a first location configured to receive the zero-point end of the measuring tape. The second receiver may be configured to selectively receive the beveled cut end of the elongated work piece. The second receiver may include a second interior stop arranged to abut the acute point of the beveled cut end of the elongated work piece when the beveled cut end is received in the second receiver. The longitudinally adjustable hinge may be configured to adjust a longitudinal position of the second receiver relative to the first receiver.

Such an assistance tool may also be configured to align the first interior stop with the zero-point end of the measuring tape when the zero-point end of the measuring tape is located at the first location.

Such an assistance tool may also be configured to have an obtuse point of the beveled cut end align with the zero-point end when the elongated work piece is received in the second receiver.

Such an assistance tool may also have an offset distance between the first interior stop and second interior stop corresponding to the longitudinal position. The offset distance may be adjustable when the first receiver and second receiver are in an open position. The offset distance may be fixed when the first receiver and second receiver are in a closed position.

The longitudinally adjustable hinge of such an assistance tool may also include a pin and a plurality of open knuckles configured to slidably receive the pin. The pin may be freely slidable within the open knuckles when the first receiver and second receiver are in an open position. The pin, when receiver by the plurality of open knuckles, may have a longitudinal range corresponding to different beveled cut end angles or elongated work piece thicknesses. The pin may include pin ridges and at least one hinge of the plurality of open hinges may include hinge ridges. The hinge ridges may be configured to receive the pin ridges when the first receiver and second receiver are in a closed position.

In another embodiment, a miter measurement apparatus is provided for measuring a length of a work piece having a beveled cut end with a measuring tape having a zero-point end and an intermediate portion. The miter measurement apparatus includes a first body, a second body, a tape channel, a longitudinally adjustable hinge, and a latch. The first body may include a first receptacle having a receptacle length defining a lengthwise direction. The first receptacle may include a first interior stop. The second body may include a second receptacle having a second interior stop. The second interior stop may be offset from the first interior stop in the lengthwise direction by an offset distance. The tape channel may be defined between the first body and second body. The tape channel may be configured to receive the intermediate portion of the measuring tape. The tape channel may have a defined location configured to receive the zero-point end. The longitudinally adjustable hinge may connect the first body and the second body along the longitudinal direction. The longitudinally adjustable hinge may allow pivotal movement of the first body relative to the second body between an open position and a closed position. The open position may allow the intermediate portion of the measuring tape to be placed in the tape channel. The closed position may clamp the intermediate portion of the measuring tape in the tape channel. The latch may be configured to latch the first body to the second body in the close position.

Such an apparatus may also be configured to have the offset distance adjustable when the longitudinally adjustable hinge is in the open position in the longitudinal direction when the longitudinally adjustable hinge is in the closed position.

Such an apparatus may also be configured to have the offset distance corresponding to a lengthwise cut length defined between an acute point of the beveled cut end and an obtuse point of the beveled cut end. The lengthwise cut length may be parallel to the lengthwise direction when the workpiece is parallel to the lengthwise direction.

Such an apparatus may also include a plurality of positional indication ridges corresponding to the offset distance. The plurality of position indication ridges may be accessible in the open position.

Such an apparatus may also include a plurality of longitudinal protrusions disposed in the tape channel. The plurality of longitudinal protrusions may be parallel to the lengthwise direction. The plurality of longitudinal protrusions may be configured to receive the intermediate portion in the closed position when the measuring tape is oriented with a concave side facing the second body.

DETAILED DESCRIPTION OF THE INVENTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Referring to FIGS. 1-11, a miter measurement apparatus 10 is shown. The miter measurement apparatus 10 may be referred to as an assistance tool 10, a measurement apparatus 10, or a measuring apparatus 10. The measurement apparatus 10 is configured to measure a length 12 of an elongated member 14 having a beveled cut end 16 with a measuring tape 18 having a zero-point end 20 and an intermediate portion 22. The elongated member 14 may also be referred to as an elongated work piece 14 or a work piece 14. The measurement apparatus 10 may be used in various fields including carpentry, plumping, metal working, and the like. The elongated member 14 may be any work piece where a beveled cut end 16 would be useful (e.g., a molding, a trim piece, a pipe, or the like). The zero-point end 20 of the measuring tape 18 may be referred to as the L-shaped end 20. The beveled cut end 16 of the elongated member 14 includes a bevel angle 24 having an acute point 26 and an obtuse point 28. The acute point 26 is the outermost point on the beveled cut end 16 of the elongated member 14. The length 12 can either be measured from the acute point 26 or the obtuse point 28.

The measurement apparatus 10 may include a first receptacle 30 having a receptacle length 32 defining a lengthwise direction 34. The lengthwise direction 34 may be referred to as a longitudinal direction 34. The first receptacle 30 is configured to receive the beveled cut end 16 of the elongated member 14 with the length 12 of the elongated member 14 extending in the lengthwise direction 34. The first receptacle 30 may be configured to measure the length 12 of the elongated member 14 from the acute point 26. As can best be seen in FIG. 3, the first receptacle 30 may include a first interior stop 36. The first interior stop 36 may be configured to abut the acute point 26 of the elongated member 14. The first receptacle 30 may further include a first location 38 configured to receive the zero-point end 20 of the measuring tape 18. The first location 38 may also be referred to as a zero-point location 38.

Figure 2A:
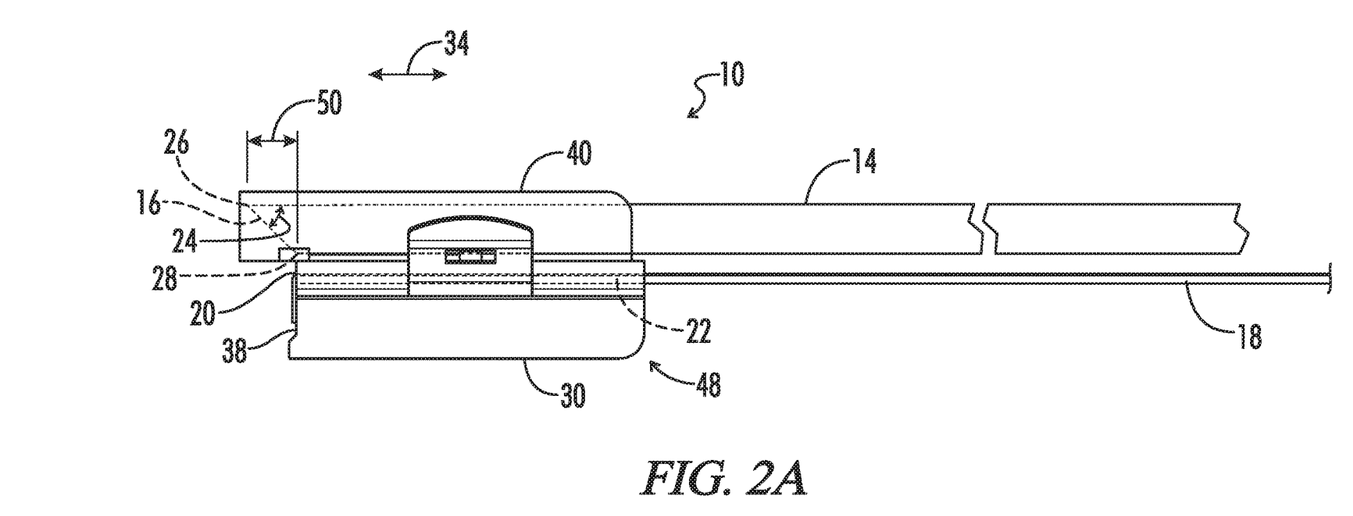
FIG. 2A is right side elevational view of the miter measurement apparatus of FIG. 1 with the elongated member received in a first receptacle.
Figure 2B:
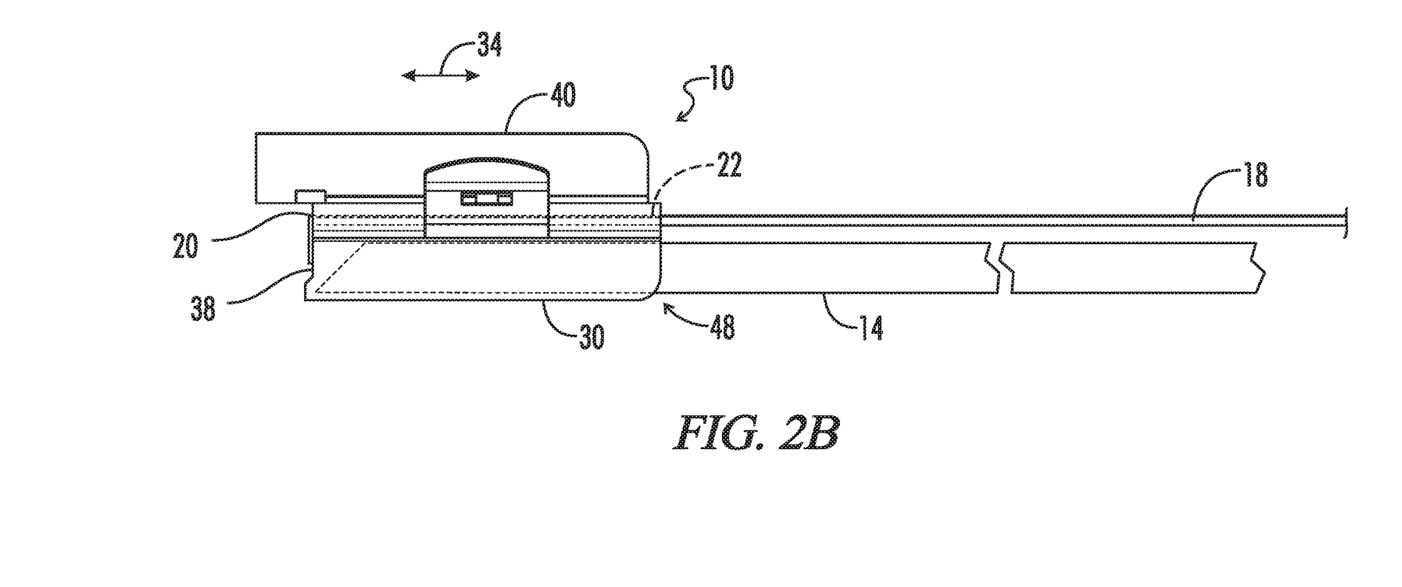
FIG. 2B is right side elevational view of the miter measurement apparatus of FIG. 1 with the elongated member received in a second receptacle.
Figure 3:
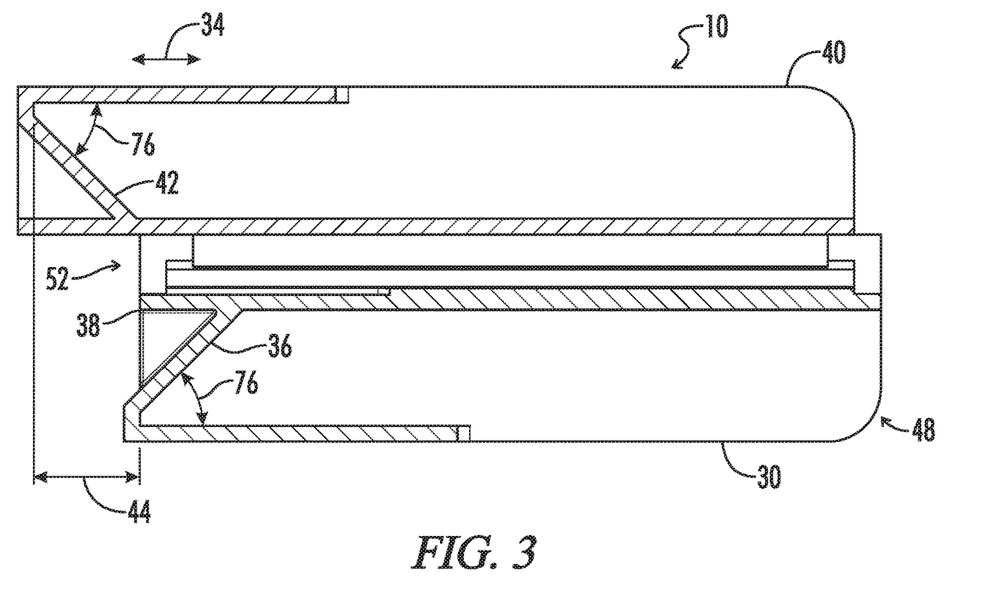
FIG. 3 is a cross-sectional right side elevational view of the miter measurement apparatus of FIG. 1.
Figure 4:
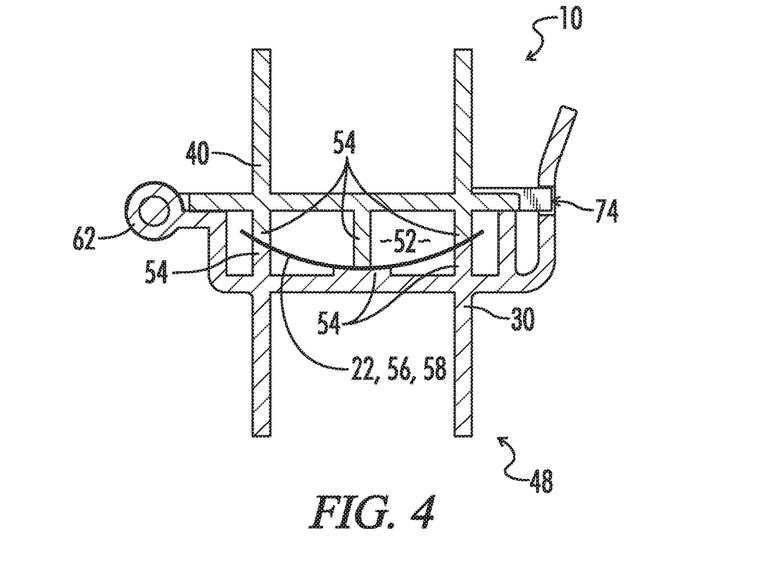
FIG. 4 is a cross-sectional front elevational view of the miter measurement apparatus of FIG. 1.

As can best be seen in FIGS. 2 and 3, the first interior stop 36 is configured to align with the zero-point end 20 of the measuring tape 18 when the zero-point end 20 is located at the first location 38. The acute point 26 of the elongated member 14 may align with the zero-point end 20 when the beveled cut end 16 of the elongated member 14 is received in the first receptacle 30.

The measurement apparatus 10 may further include a second receptacle 40. The second receptacle 40 may be configured to receive the beveled cut end 16 of the elongated member 14 with the length 12 of the elongated member 14 extending in the lengthwise direction 34. The second receptacle 40 may be configured to measure the length 12 of the elongated member 14 from the obtuse point 28. As can best be seen in FIG. 3, the second receptacle 40 includes a second interior stop 42. The second interior stop 42 may be configured to abut the acute point 26 of the elongated member 14. The second interior stop 42 may be offset from the first interior stop 36 in the lengthwise direction 34 by an offset distance 44. The offset distance 44 may also be referred to as a longitudinal position 44.

As can best be seen in FIGS. 2 and 3, the second interior stop 42 may be configured to align the obtuse point 28 of the beveled cut end 16 with the zero-point end 20 when the beveled cut end 16 of the elongated member 14 is received in the second receptacle 40.

In some embodiments, the offset distance 44 may be adjustable. The offset distance 44 may be adjustable when the first receptacle 30 and second receptacle 40 are in an open position 46. The offset distance 44 may be fixed when the first receptacle 30 and second receptacle 40 are in a closed position 48. The offset distance 44 may be configured to correspond to a lengthwise cut length 50 of the beveled cut end 16 defined between the acute point 26 and the obtuse point 28 in the lengthwise direction 34 when the length 12 of the elongated member 14 is parallel to the lengthwise direction 34. The adjustable offset distance 44 allows the obtuse point 28 of different size elongated members and elongated members with different bevel angles 24 to be aligned with the zero-point end 20.

In some embodiments, the first receptacle 30 and second receptacle 40 may be configured to couple to an intermediate portion 22 of the measuring tape 18 extending in the lengthwise direction 34.

Figure 5:
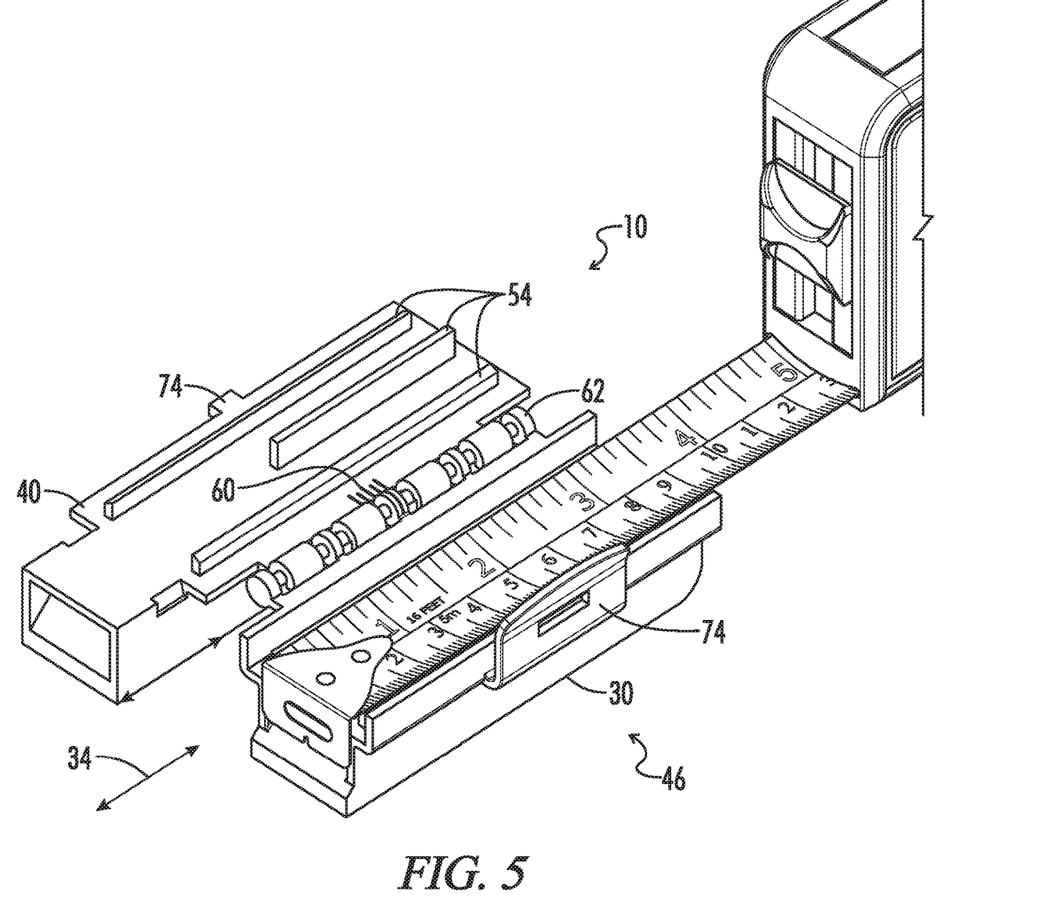
FIG. 5 is a perspective view of the miter measurement apparatus of FIG. 1 in an open position.

As can best be seen in FIGS. 3-4 and 9-10, the measurement apparatus 10 may further include a tape channel 52. The tape channel 52 may be positioned between the first receptacle 30 and the second receptacle 40. The tape channel 52 may be configured to receive the intermediate portion 22 of the measuring tape 18. When the first receptacle 30 and second receptacle 40 are in the open position 46 as seen in FIG. 5, the intermediate portion 22 of the measuring tape 18 may be placed into and adjusted within the tape channel 52. When the first receptacle 30 and second receptacle 40 are in the closed position 48 as seem in FIG. 4, the intermediate portion 22 of the measuring tape 18 may be clamped into place within the tape channel 52. The tape channel 52 may include the first location 38 configured to receive the zero-point end 20 of the measuring tape 18.

Figure 6:
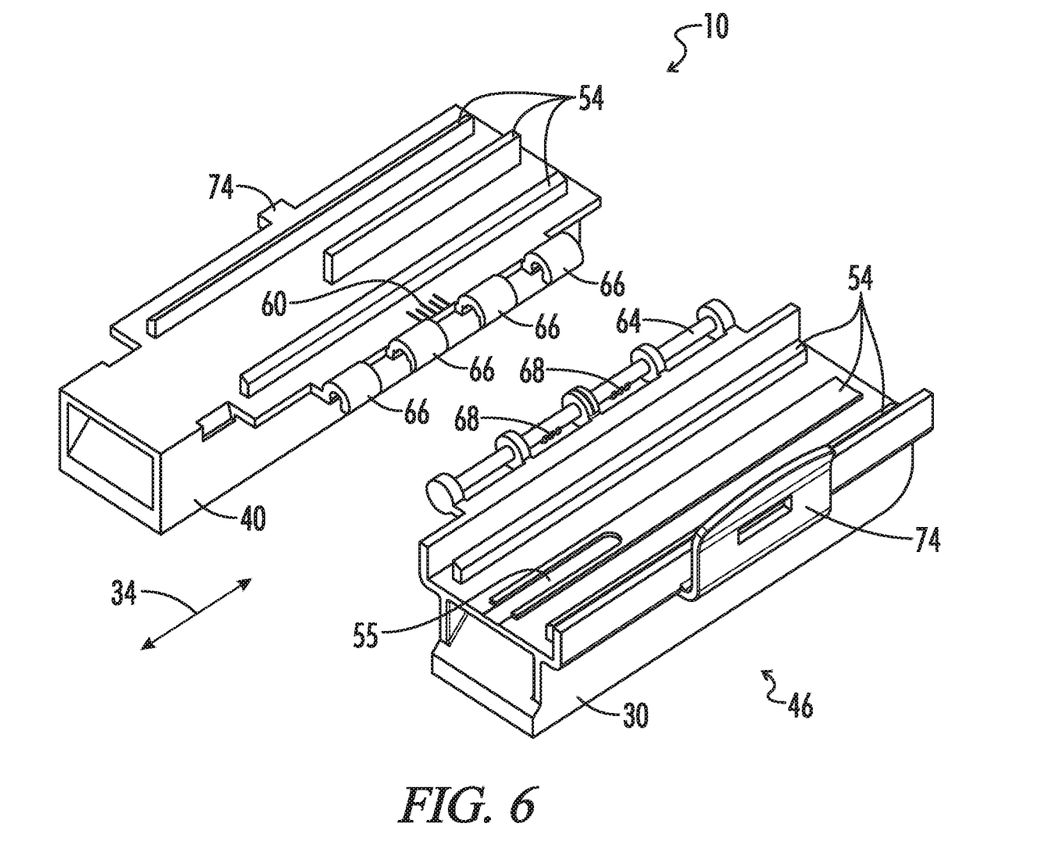
FIG. 6 is an exploded perspective view of the miter measurement apparatus of FIG. 5.
Figure 7:
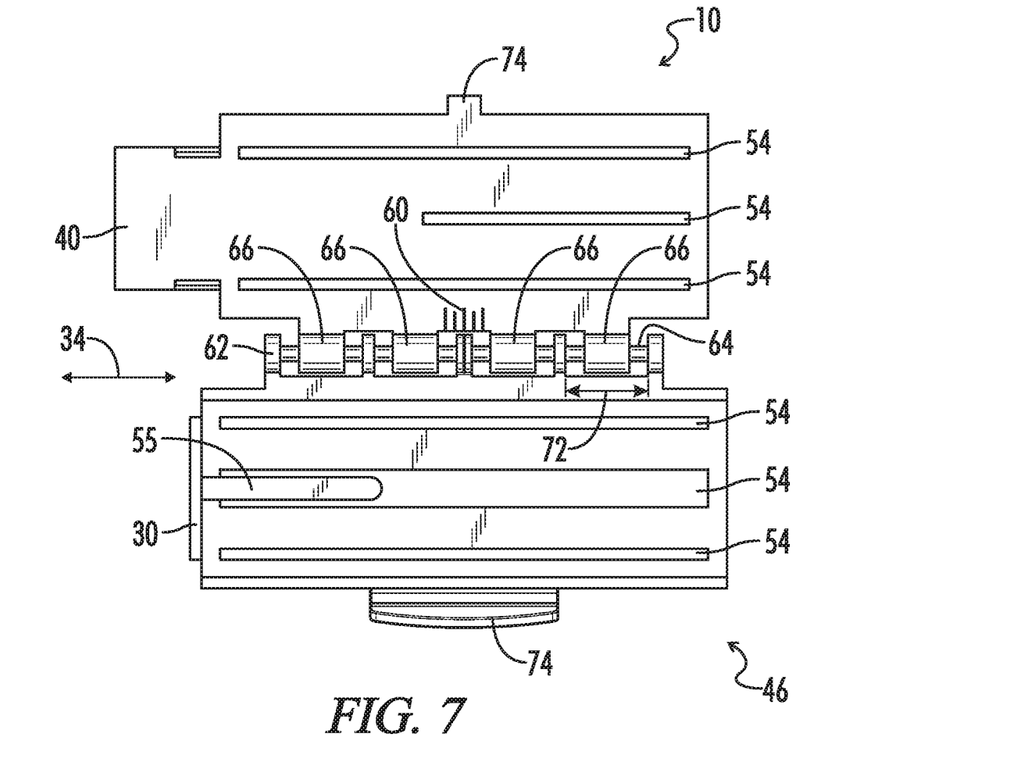
FIG. 7 is a top plan view of the miter measurement apparatus of FIG. 5.

As can best be seen in FIGS. 5-7, the tape channel 52 may include a plurality of lengthwise protrusions 54. The lengthwise protrusions 54 may also be referred to as longitudinal protrusions 54. The lengthwise protrusions 54 may be parallel to the lengthwise direction 34. The longitudinal protrusions 54 corresponding with a midline of the measuring tape 18 may include an open area 55 for receiving the zero-point end 20 of the measuring tape 18 and any additional pieces the zero-point end may have. The lengthwise protrusions 54 may be configured to frictionally engage the intermediate portion 22 of the measuring tape 18. The tape channel 52 may have a tape receiving profile 56 defined by the plurality of lengthwise protrusions 54. The tape receiving profile 56 may be configured to match a tape profile 58 of the intermediate portion 22 of the measuring tape 18. A typical tape profile 58 is arcuate. The tape receiving profile 56, in other embodiments, may accommodate different tape profiles 58 such as a flat profile. The tape channel 52 may be configured to receive the intermediate portion 22 in the closed position 48 when the tape profile 58 aligned with the tape receiving profile 56.

As can best be seen in FIGS. 5-7, the tape channel 52 may include a plurality of location markers 60 for indicating the offset distance 44. The location markers 60 may also be referred to as position indication ridges 60. The plurality of location markers 60 may be accessible in the open position 46. The location markers 60 may be perpendicular to the lengthwise direction 34. In some embodiments, each location marker 52 may include additional information relating to an elongated member thickness (not shown) or the bevel angle 24 to aid in adjusting the offset distance 44.

Figure 11:
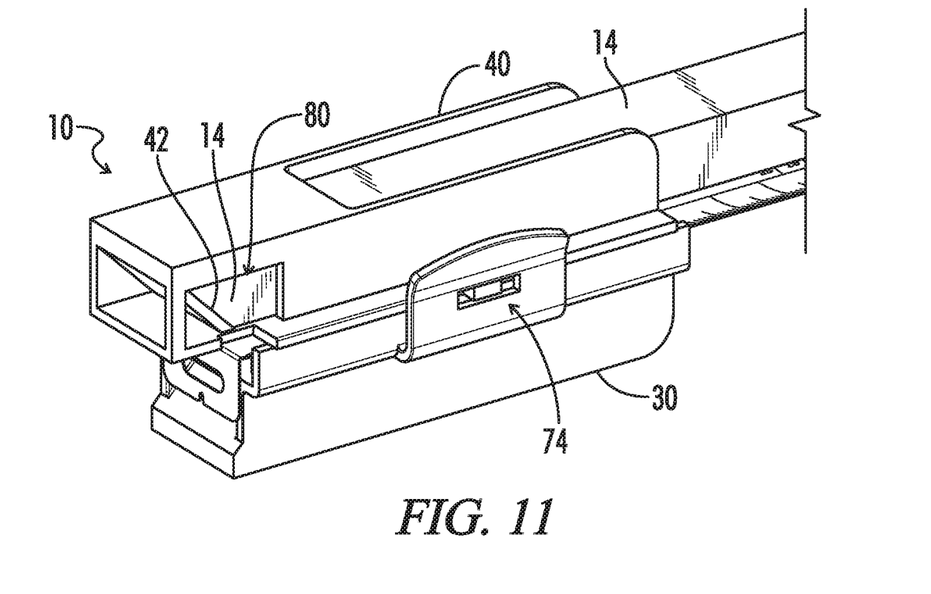
FIG. 11 is an enlarged perspective view of the miter measurement apparatus of FIG. 1 with a window defined in at least one of the receptacles.

In certain embodiments, as shown in FIG. 11, the second receptacle may include a window 80 to view the obtuse point 28 of the beveled cut end 16 when the elongated member 14 is received in the second receptacle 40. The window 80 may be accessible when the measurement apparatus 10 is in the closed position 48 as shown in FIG. 11. The window 80 may be accessible when the measurement apparatus 10 is in the open position 48 (not shown). The window may aid in adjustment of the offset distance 44. The window 80 may also aid in ensuring that the beveled cut end 16 of the elongated member 14 is properly positioned in the second receptacle 40. The window 80 may also be used to check the second receptacle 40 for any foreign object that could interfere with the positioning of the beveled cut end 16 of the elongated member 14. The second receptacle 40 may include a plurality of lines (not shown) extending from the window to the first receptacle 30. The lines may be perpendicular to the lengthwise direction 34. The lines may aid in ensuring proper alignment of the offset distance 44. The lines may also correspond to the location markers 60. In other embodiments, the first receptacle may also include a window (not shown).

The measurement apparatus 10 may further include a longitudinally adjustable hinge 62. The longitudinally adjustable hinge 62 may pivotally connect the first receptacle 30 and the second receptacle 40 along the lengthwise direction 34. The longitudinally adjustable hinge 62 may be configured to adjust the offset distance 44 between the first receptacle 30 and the second receptacle 40. In the open position 46, the longitudinally adjustable hinge 46 allows the offset distance 44 to be adjusted. In the closed position 48, the longitudinally adjustable hinge 46 fixes the offset distance 44.

Figure 8:
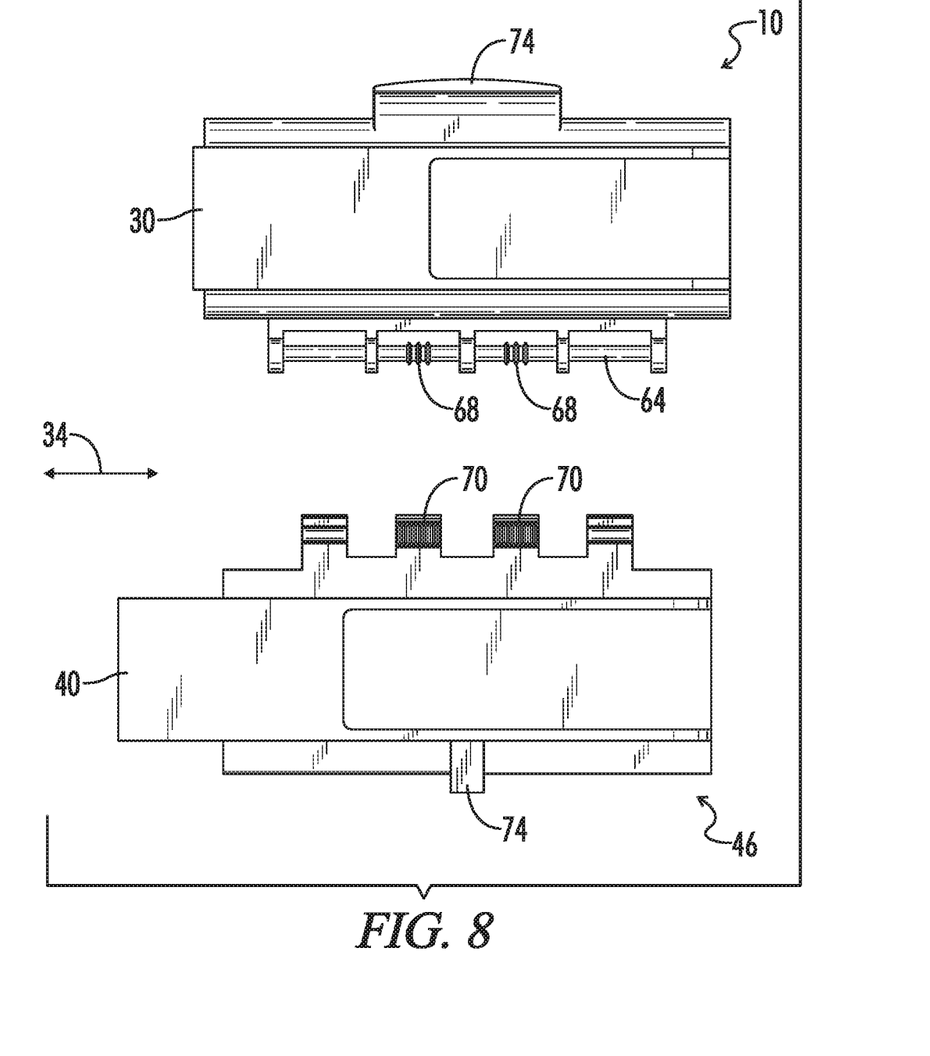
FIG. 8 is an exploded bottom plan view of the miter measurement apparatus of FIG. 5.
Figure 9:
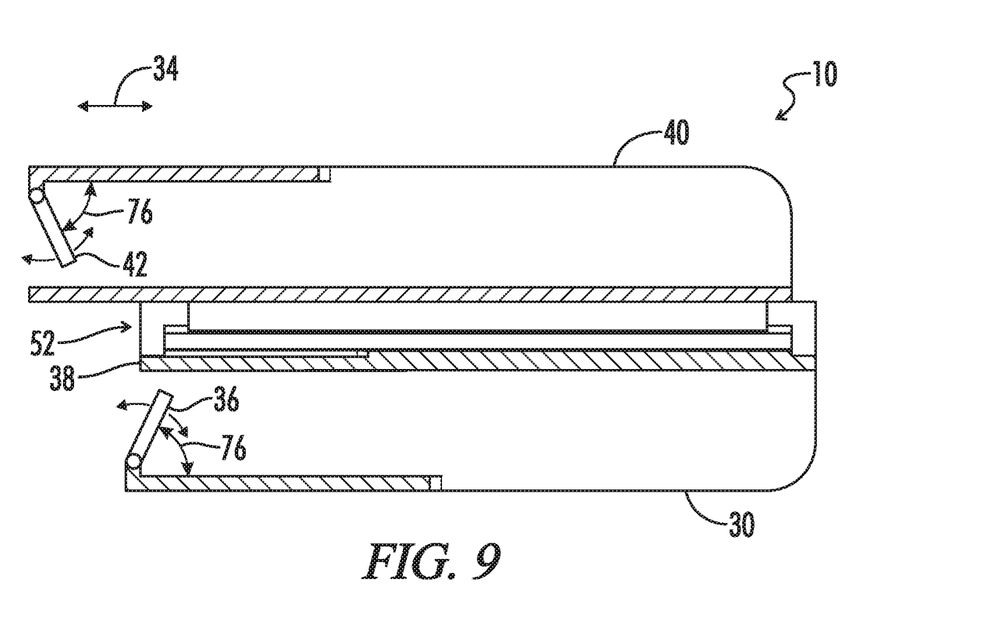
FIG. 9 is a cross-sectional right side elevational view of the miter measurement apparatus of FIG. 1 with adjustable first and second interior stops.
Figure 10:
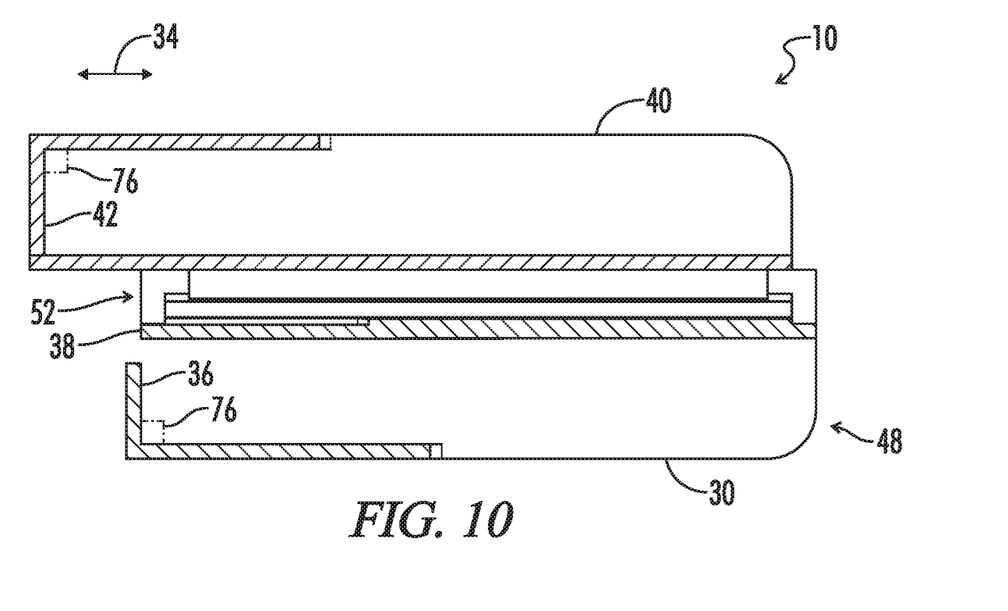
FIG. 10 is a cross-sectional right side elevational view of the miter measurement apparatus of FIG. 1 with first and second interior stops perpendicular to a lengthwise direction.

As can best be seen in FIGS. 5-8, the longitudinally adjustable hinge 62 may include a pin 64 and a plurality of open knuckles 66. The plurality of open knuckles 50 may be configured to slidably receive the pin 64 in the lengthwise direction 26 when the first receptacle 30 and second receptacle 40 are in the open position 46. Turning now to FIGS. 6 and 8, the pin 64 may have first interlocking elements 68 and the plurality of open knuckles 66 may have second interlocking elements 70. The first interlocking elements 68 may also be referred to as pin ridges 68. The second interlocking elements 70 may be referred to as hinge ridges 70. The first interlocking elements 68 and second interlocking elements 70 may interact to prevent sliding in the closed position 48. The pin 64 and plurality of open knuckles may have a longitudinal range 72 of adjustability in the open position 46. The longitudinal range 72 may be selected based on the elongated member type, the elongated member profile, and to accommodate a range of bevel angles 24. The longitudinal range 72 may affect the adjustability of the offset distance 44.

In other embodiments, the first receptacle 30 and second receptacles 40 may be coupled together using any available means known to one of skill in the art. In still other embodiments, the first interior stops 36 and second interior stop 42 may be adjustable with respect to the lengthwise direction 34. Lengthwise adjustability of the interior stops 36, 42 could be used in conjunction with or as an alternative to the longitudinally adjustable hinge 62 or other means of attaching the first receptacle 30 and second receptacles 40.

Figure 1:
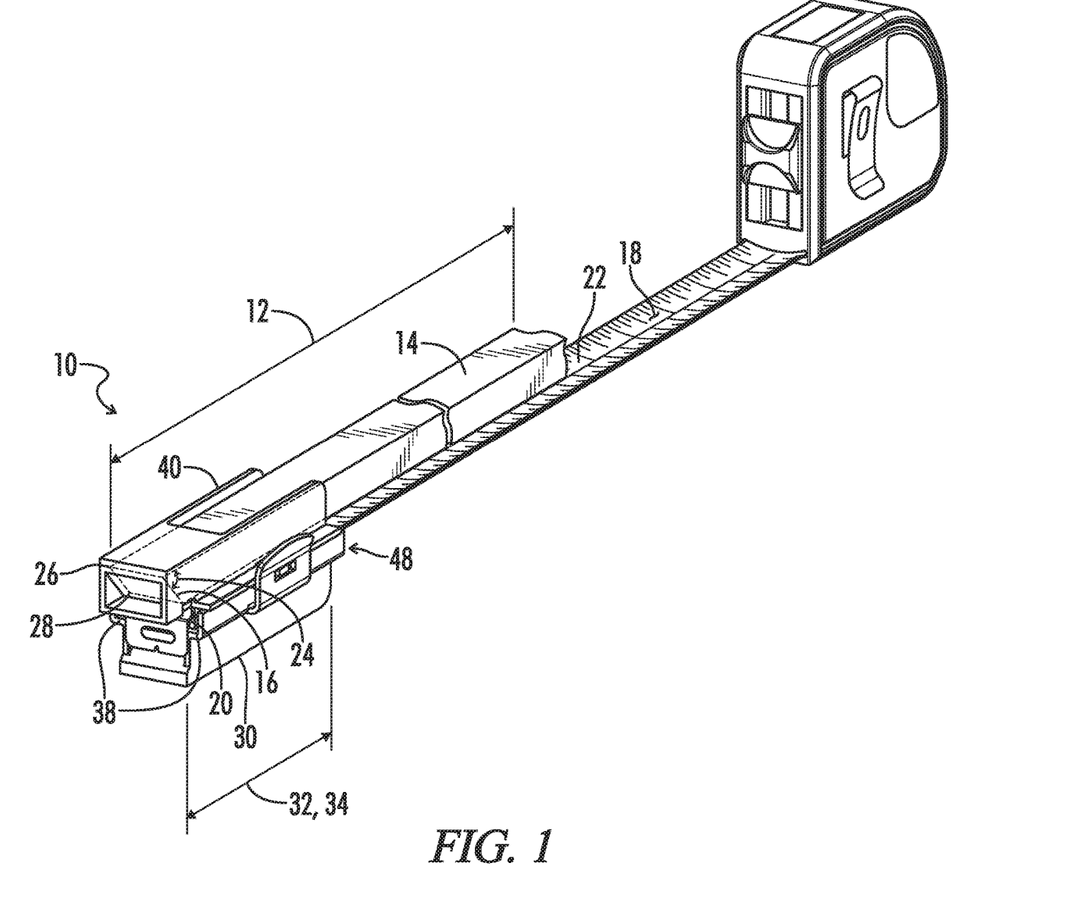
FIG. 1 is a perspective view of a miter measurement apparatus in a closed position having an elongated member received in a second receptacle and a zero-point end of a measuring tape received at a first location in accordance with the present disclosure.

The measurement apparatus 10 may further include a latch 74. The latch 74 may be configured to selectively fix the relative positions of the first receptacle 30 and second receptacle 40 in the closed position 48. As shown, the latch 74 works in conjunction with the longitudinally adjustable hinge 62 to keep the first receptacle 30 and second receptacle 40 in the closed position 48. The latch 74 as shown in FIG. 1 is a slam latch. In other embodiments, the latch may be a draw latch, a magnetic catch, a toggle clamp, a window latch, or the like.

As best shown in FIG. 3, the first interior stop 36 and second interior stop 42 may each oriented at a stop angle 76 relative to the lengthwise direction 34. As can best be seen in FIG. 9, the stop angle may 76 may be adjustable. The stop angle 76 may be configured to match the bevel angle 24 of the beveled cut end 16 of the elongated member 14. In other embodiments, the stop angle 76 may be perpendicular to the lengthwise direction 34, shown in FIG. 10. As can best be seen in FIG. 10, the first interior stop 36 has the stop angle 76 perpendicular to the lengthwise direction 34. This embodiment includes a zero-point opening 78 for receiving the zero-point end 20 of the measuring tape 18. The zero-point opening 78 may ensure that the zero-point end 20 of the measuring tape 18 is aligned with the first interior stop 36. This ensures accurate measurement of the length 12 of the elongated member 14.

The measurement apparatus may be manufactured with receptacles of varying sizes corresponding to different trim types, trim cross-sectional profiles, and/or other features of the elongated member.

As an example, the measurement apparatus configured for ½"×¾" or ½"×½" quarter round or shoe molding may have a first receptacle length of 3⁹⁄₁₆", a second receptacle length of 3¹⁵⁄₁₆", and an offset distance of ½". The offset distance of ½" corresponding to a 45 degree bevel angle. The longitudinal range of the longitudinally adjustable hinge of the example is approximately +/−⅛". This may be described as having a longitudinal range 72 of 50% of the ½" quarter round. In other embodiments, the longitudinal range may be larger to allow for increased adjustment for larger ranges of beveled angles. For example, a range of 100% of the ½" quarter round (i.e., +/−¼") may allow accurate adjustment to cover bevel angles between 26 degree and 56 degrees. In some embodiments, the longitudinal range may be unequally balanced, for example +½" and −¼", allowing for accommodation of bevel angles 24 between 26 degree and 64 degrees.

Thus, although there have been described particular embodiments of the present invention of a new and useful ATTACHMENT FOR TAPE MEASURE THAT CAN RECEIVE AN ELONGATED MEMBER SUCH AS MOLDING it is not intended that such references be construed as limitations upon the scope of this invention except as set forth in the following claims.

What is claimed is:

1. A miter measurement apparatus for measuring a length of an elongated member having a beveled cut end with a measuring tape having a zero-point end, the miter measurement apparatus comprising:

a first receptacle having a receptacle length defining a lengthwise direction, the first receptacle being configured to receive the beveled cut end of the elongated member with the length of the elongated member extending in the lengthwise direction, the first receptacle including a first interior stop, the first receptacle further including a first location configured to receive the zero-point end;

a second receptacle being configured to receive the beveled cut end of the elongated member with the length of the elongated member extending in the lengthwise direction, the second receptacle having a second interior stop offset by an offset distance in the lengthwise direction from the first interior stop; and a tape receiving channel positioned between the first receptacle and the second receptacle.

2. The miter measurement apparatus of claim 1, wherein the first interior stop is configured to align with the zero-point end.

3. The miter measurement apparatus of claim 1, wherein the offset distance is adjustable.

4. The miter measurement apparatus of claim 1, wherein the first receptacle and second receptacle are configured to couple to an intermediate portion of the measuring tape extending in the lengthwise direction.

5. The miter measurement apparatus of claim 1, wherein the tape receiving channel includes a plurality of location markers for indicating the offset distance.

6. The miter measurement apparatus of claim 1, wherein the tape receiving channel includes a plurality lengthwise protrusions configured to frictionally engage an intermediate portion of the measuring tape.

7. The miter measurement apparatus of claim 1, further comprising a longitudinally adjustable hinge configured to pivotally attach the first receptacle and the second receptacle in the lengthwise direction.

8. The miter measurement apparatus of claim 7, wherein the longitudinally adjustable hinge includes a pin and a plurality of open knuckles configured to slidably receive the pin, and wherein the pin and plurality of open knuckles have first and second interlocking elements that prevent sliding in a closed position.

9. The miter measurement apparatus of claim 7, wherein the offset distance is adjustable when the longitudinally adjustable hinge is in an open position, and wherein the offset distance is fixed when the hinge is in a closed position.

10. The miter measurement apparatus of claim 1, further comprising a latch configured to selectively fix the relative positions of the first receptacle and the second receptacle.

11. The miter measurement apparatus of claim 1, wherein the first interior stop and second interior stop each are oriented at a stop angle relative to the lengthwise direction, the stop angle corresponding with a beveled angle of the beveled cut end.

12. The miter measurement apparatus of claim 11, wherein the stop angle is adjustable.

13. An assistance tool for measuring a length of an elongated work piece having a beveled cut end with a measuring tape having a zero-point end, the assistance tool comprising:

a first receiver having a receiver length defining a longitudinal direction, the first receiver being configured to selectively receive the beveled cut end of the elongated work piece with the length of the elongated work piece extending in the longitudinal direction, the first receiver including a first interior stop arranged to abut an acute point of the beveled cut end, the first receiver further including a first location configured to receive the zero-point end;

a second receiver configured to selectively receive the beveled cut end of the elongated work piece, the second receiver including a second interior stop arranged to abut the acute point; and a longitudinally adjustable hinge connecting the first receiver and the second receiver, the longitudinally adjustable hinge being configured to adjust a longitudinal position of the second receiver relative to the first receiver.

14. The assistance tool of claim 13, wherein the first interior stop is configured to align with the zero-point end when the zero point end is located at the first location.

15. The assistance tool of claim 14, wherein an obtuse point of the beveled cut is configured to align with the zero-point end when the elongated work piece is received in the second receiver.

16. The assistance tool of claim 13, wherein the longitudinal position corresponds to an offset distance between the first interior stop and the second interior stop, and wherein the offset distance is adjustable when the first receiver and second receiver are in an open position, and wherein the offset distance is fixed when the first receiver and second receiver are in a closed position.

17. The assistance tool of claim 13, wherein the longitudinally adjustable hinge includes a pin and a plurality of open knuckles configured to slidably receive the pin when the first receiver and second receiver are in an open position, and wherein the pin when received by the plurality of open knuckles has a longitudinal range corresponding to different beveled cut angles.

18. The assistance tool of claim 17, wherein the pin includes pin ridges and the hinge includes hinge ridges configured to receive the pin ridges when the first receiver and second receiver are in a closed position.

19. A miter measurement apparatus for measuring a length of a work piece having a beveled cut end with a measuring tape having a zero-point end and an intermediate portion, the miter measuring apparatus comprising:

a first body including a first receptacle having a receptacle length defining a lengthwise direction, the first receptacle including a first interior stop;

a second body including a second receptacle having a second interior stop offset by an offset distance in the lengthwise direction from the first interior stop;

a tape channel defined between the first body and the second body, the tape channel configured to receive the intermediate portion, the tape channel including a zero-point location configured to receive the zero-point end;

a longitudinally adjustable hinge connecting the first body and the second body, the hinge permitting pivotal movement of the first body relative to the second body between an open position wherein the intermediate portion of the measuring tape can be placed in the tape channel, and a closed position wherein the intermediate portion of the measuring tape is clamped in the tape channel; and a latch configured to latch attach the first body to the second body in the closed position.

20. The miter measurement apparatus of claim 19, wherein the offset distance is adjustable in the open position, and wherein the offset distance is fixed in the closed position.

21. The miter measurement apparatus of claim 19, wherein the offset distance corresponds to a lengthwise cut length defined between an acute point of the beveled cut end and an obtuse point of the beveled cut end, the lengthwise cut length being parallel to the lengthwise direction when the workpiece is parallel to the lengthwise direction.

22. The miter measurement apparatus of claim 19, wherein the tape receiving channel includes a plurality of position indication ridges corresponding to the offset distance, and wherein the plurality of position indication ridges are accessible in the open position.

23. The miter measurement apparatus of claim 19, wherein the tape channel includes a plurality of longitudinal protrusions parallel to the lengthwise direction, the longitudinal protrusions configured to receive the intermediate portion in the closed position when the measuring tape is oriented with a concave side facing the second body.

* * * * *